United States Patent
Fujihara

(10) Patent No.: US 6,785,399 B2
(45) Date of Patent: *Aug. 31, 2004

(54) RECEIVING APPARATUS, TRANSMITTING APPARATUS, AND COMMUNICATION SYSTEM WHICH UTILIZE A WATERMARK INSERTION TECHNIQUE

(75) Inventor: Shiro Fujihara, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,186

(22) Filed: Apr. 27, 1999

(65) Prior Publication Data

US 2002/0164045 A1 Nov. 7, 2002

(30) Foreign Application Priority Data

Apr. 27, 1998 (JP) .......................................... 10-116615

(51) Int. Cl.[7] .................................................. G06K 9/00
(52) U.S. Cl. ..................................................... 382/100
(58) Field of Search .............................. 382/100, 232; 380/201, 202, 203, 204, 210, 211, 216, 218, 220; 713/175, 176; 370/527, 529; 348/460, 461, 462; 725/14, 15, 18, 20, 22, 31, 68, 89; 375/150, 216, 300, 320

(56) References Cited

U.S. PATENT DOCUMENTS

| | | | | |
|---|---|---|---|---|
| 4,807,031 A | * | 2/1989 | Broughton et al. | 348/460 |
| 4,807,285 A | * | 2/1989 | Marland | 380/226 |
| 5,270,800 A | * | 12/1993 | Sweet | 348/589 |
| 5,363,144 A | * | 11/1994 | Park | 348/614 |
| 5,483,069 A | * | 1/1996 | Kofune et al. | 250/341.8 |
| 5,535,147 A | * | 7/1996 | Jacobs et al. | 708/111 |
| 5,668,897 A | * | 9/1997 | Stolfo | 382/283 |
| 5,719,943 A | * | 2/1998 | Amada et al. | 380/202 |
| 5,745,569 A | * | 4/1998 | Moskowitz et al. | 705/58 |
| 5,809,139 A | * | 9/1998 | Girod et al. | 380/202 |
| 5,841,978 A | * | 11/1998 | Rhoads | 709/217 |
| 5,884,033 A | * | 3/1999 | Duvall et al. | 709/206 |
| 5,917,915 A | * | 6/1999 | Hirose | 380/228 |
| 6,105,060 A | * | 8/2000 | Rothblatt | 709/219 |
| 6,182,218 B1 | * | 1/2001 | Saito | 713/176 |
| 6,216,228 B1 | * | 4/2001 | Chapman et al. | 713/176 |
| 6,373,960 B1 | * | 4/2002 | Conover et al. | 382/100 |
| 6,411,725 B1 | * | 6/2002 | Rhoads | 382/100 |
| 6,415,439 B1 | * | 7/2002 | Randell et al. | 725/153 |
| 6,665,873 B1 | * | 12/2003 | Van Gestel et al. | 725/136 |

FOREIGN PATENT DOCUMENTS

| | | | | |
|---|---|---|---|---|
| JP | 1-309584 | 12/1989 | | H04N/7/00 |
| JP | 7-212712 | 8/1995 | | H04N/5/92 |
| JP | 9-191394 | 7/1997 | | H04N/1/387 |
| WO | WO 96/38946 | 12/1996 | | H04L/9/00 |

* cited by examiner

Primary Examiner—Andrew W. Johns
Assistant Examiner—Shervin Nakhjavan
(74) Attorney, Agent, or Firm—Scully, Scott, Murphy & Presser

(57) ABSTRACT

In a communication system, a transmitting device transmits an image datum to which a specified datum is inserted as an electronic watermark by watermark insertion technique. The image datum represents an image. The specified datum represents a specified process for a receiving apparatus for receiving the image datum. In the receiving apparatus, a processing arrangement is responsive to the image datum and processes the specified datum to execute the specified process. A producing arrangement is responsive to the image data and produce the image.

8 Claims, 1 Drawing Sheet

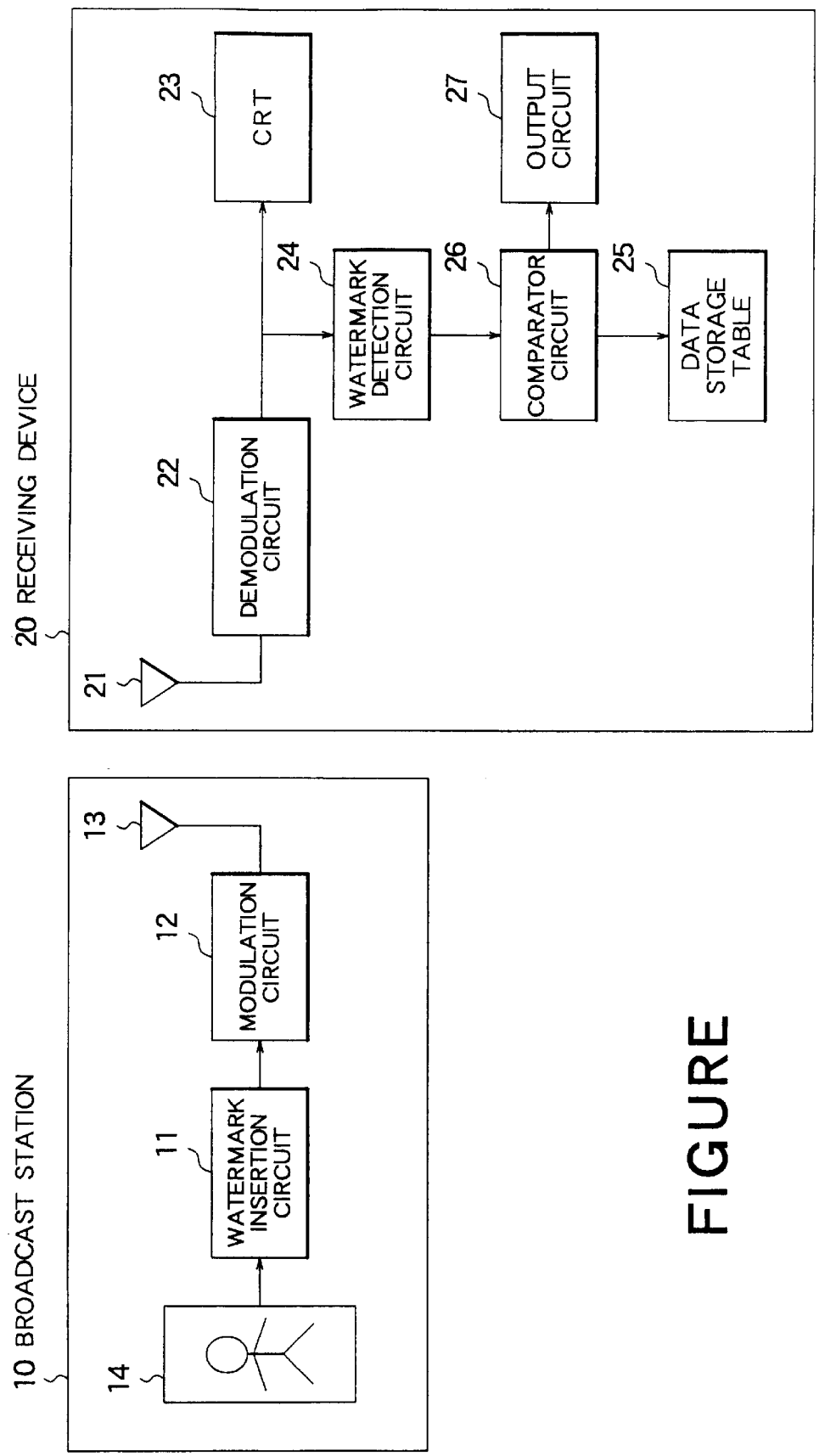
FIGURE

RECEIVING APPARATUS, TRANSMITTING APPARATUS, AND COMMUNICATION SYSTEM WHICH UTILIZE A WATERMARK INSERTION TECHNIQUE

BACKGROUND OF THE INVENTION

The present invention relates to a receiving apparatus and a transmitting apparatus which are suitable for a broadcast system, and to a communication system comprising the receiving apparatus and the transmitting apparatus.

In a conventional broadcast system which is one of a communication systems, an attention has been focused on a fact that a radio broadcasting wave has an eclipsing (or blanking) period and based on this eclipsing period, data or information has been inserted into the eclipsing period. In this method, in addition to primary data representing dynamic image (foreground image) by the radio broadcasting wave and a voice, subsidiary data representing a static image (background image) can also be transmitted to the receiving apparatus. Accordingly, the receiving apparatus permits to reproduce the dynamic image and voice or sound in accordance with the primary data and, in addition, static image and voice or sound in accordance with the subsidiary data.

In the method of superimposing the data in the eclipsing (blanking) period of the radio broadcasting wave, there is a problem that it is not possible to transmit the data which commands different processing relative to the same and equal image. In other words, the data is superimposed in the eclipsing period and, therefore, there is only one command for processing relative to the image.

Besides, in terms of copyright protection and enforcement in these days, an attempt has been made to insert an electronic watermark into a given image as suggested by, for example, Japanese Unexamined Patent Publication (JP-A) No. 9-191394. The watermark is realized by inserting specified data into the intended image. In this case, the image into which the watermark is inserted is almost equivalent to the other image having no watermark inserted thereinto to human eyes and the inserted watermark is not recognized visually. Further, a watermark insertion technique as described above permits prevention of unauthorized or uncertified utilization of image, as shown in Japanese Unexamined Patent Publication (JP-A) No. 7-212712.

SUMMARY OF THE INVENTION

It is therefore an object of the present invention to provide a new receiving apparatus which permits to command a plurality of processes simultaneously relative to the image, by utilizing the watermark insertion technique.

It is another object of the present invention to provide a communication system comprising the receiving apparatus and a transmitting apparatus for transmitting an image datum to which a specified datum is inserted as a watermark.

It is still another object of the present invention to provide a transmitting apparatus included in the communication system.

Other objects of the present invention will become clear as the description proceeds.

According to a first aspect of the present invention, there is provided a receiving apparatus for use in reception of an image datum to which a specified datum is inserted as a watermark by a watermark insertion technique. The image datum represents an image. The specified datum represents a specified process for the receiving apparatus. The receiving apparatus comprises receiving means for receiving the image datum, producing means connected to the receiving means and responsive to the image data for producing the image, and processing means connected to the receiving means and responsive to the image datum for processing the specified datum to execute the specified process.

According to a second aspect of the invention, there is provided a communication system comprising the above-mentioned receiving apparatus and a transmitting apparatus for transmitting an image datum to which a specified datum is inserted as a watermark by a watermark insertion technique. The image datum represents an image. The specified datum represents a specified process for the receiving apparatus.

According to a third aspect of the invention, there is provided a transmitting apparatus for use in transmission of an image datum towards a receiving apparatus. The image datum represents an image. The transmitting apparatus comprises an insertion circuit for inserting a specified datum as a watermark into the image datum by a watermark insertion technique. The specified datum represents a specified process for the receiving apparatus. The transmitting apparatus further comprises transmission executing means connected to the insertion circuit for executing transmission of the image datum.

BRIEF DESCRIPTION OF THE DRAWING

The attached FIGURE is a block diagram of a broadcasting system as an embodiment of the present invention.

DESCRIPTION OF THE PREFERRED EMBODIMENT

An embodiment of the present invention will be described with reference to a FIGURE which shows a broadcasting system including a broadcast station 10 and a number of receiving devices, one of which is shown by reference numeral 20.

The broadcast station 10 has a watermark insertion circuit 11, a modulation circuit 12, and a transmitting antenna 13. The watermark insertion circuit 11 serves to insert a specified code (specified data) representing a specified process into an image 14 by a watermark insertion technique as electronic watermark. In other words, the watermark insertion circuit 11 inserts the specified data into image data representing the image 14. Here, a watermark insertion technique shown in the aforementioned Japanese Patent Publications (Unexamined) can be used and no further detailed description will be made herein. As a matter of course, when images are reproduced, no substantial difference will be found visually by human eyes between an image of watermark insertion and another image of non-insertion of a watermark. The modulation circuit 12 is connected between the watermark insertion circuit 11 and the transmitting antenna 13 and is for modulating an output of the watermark insertion circuit 11 and produce a transmission data corresponding to the image data including the specified data. The transmission data are transmitted as a modulated radio signal through the transmitting antenna 13 as similar as a general broadcasting image. Thus, the transmitting device 10 serves to insert a specified code into an image 14 or image data by means of the watermark insertion circuit 11 and then conduct a transmission of the transmission data. A combination of the modulation circuit 12 and the transmitting antenna 13 is referred to as a transmission executing arrangement.

The receiving device 20 has a receiving antenna 21, a demodulation circuit 22, a CRT 23, a watermark detection circuit 24, a data storage table 25, a comparator circuit 26, and an output circuit 27. The demodulation circuit 22 is connected to the receiving antenna 21 and is for demodulating the transmission data received by the receiving antenna 21 and to generate the receiving data corresponding to the image data including the specified data. A combination of the receiving antenna 21 and the demodulation circuit 22 is referred to as a receiving arrangement.

The CRT 23 is connected to the demodulation circuit 22 and is for generating the image in accordance with the received data. The CRT 23 is referred to as a producing arrangement.

The watermark detection circuit 24 is connected to the demodulation circuit 22 and is for detecting the specified data from the received data. The data storage table 25 is for recording and storing one or a plurality of predetermined code(s), that is, predetermined data and processing content in accordance with the predetermined code. The comparator circuit 26 is connected to the watermark detection circuit 24 and the data storage table 25 and is for comparing the specified data, detected by the watermark detection circuit 24, with the predetermined data. When the specified data are coincident with the predetermined data, the comparator circuit 26 produce a coincident signal. The output circuit 27 is connected to the comparator circuit 26 and is for executing the specified processing, such as voice reproduction and text representation, in accordance with the coincidence signal. A combination of the data storage table 25, the comparator 26, and the output circuit 27 will be referred to as an executing arrangement. A combination of the executing arrangement and the watermark detection circuit 24 is referred to as a processing arrangement.

The thus formed receiving device 20 detects the specified data, which is inserted as the electronic watermark, from the received image by means of the watermark detection circuit 24, and then compares the specified data with the aforementioned predetermined code which has been stored in the storage table 25, and when the specified data are coincident with the predetermined data, a process which is commanded by the specified code is then executed.

Next, an operational mode will be described with reference to a specific example of the invention. For the purpose of explanation, a specified code inserted into the image as a watermark will be represented by "A" and its correspondent process content will be represented by a letter or letters.

For the purpose of representing or indicating a letter or letters by the receiving device 20, the broadcast station inserts, by the watermark insertion technique, the specified code "A" into the image data by the watermark insertion circuit 11, before an intended image is transmitted. After that, The image data are then modulated by the modulation circuit 12 and transmitted as the modulated radio signal through the transmitting antenna 13 in a form of the radio broadcasting wave. The broadcasting wave transmitted from the broadcast station 10 is received by the receiving antenna 21 and demodulated by the demodulation circuit 22 into a demodulated radio signal. The demodulated radio signal is supplied to the CRT 23. Thus, the image is displayed on a screen of the CRT 23.

The demodulated radio signal is further supplied to the watermark detection circuit 24. The watermark detection circuit 24 detects the specified code "A" which is inserted into the image data. The detected specified code "A" is transmitted to the comparator circuit 26. The comparator circuit 26 compares the specified code "A" with the predetermined code which is read out from the data storage table 25. When the specified code "A" is coincident with the predetermined code, the comparator circuit 26 produces the coincidence signal to supply the coincidence signal to the output circuit 27.

The output circuit 27, having received the coincidence signal, executes the predetermined code processing which is recorded in the data storage table 25. In other words, the output circuit 27 executes the representation of text. However, when the specified code "A" is inconsistent with the predetermined code, the comparator 26 transmits no coincidence signal at all and, therefore, no processing will be made.

If the processing content of the data for a watermark insertion is stipulated to produce sound production, an attractive sound or voice can be reproduced. Further, since the data inserted into the image is of digital watermark style, no deficient result will be made to the image and, therefore, a selective transmission of the specified code data permits personal transmission of a message and processing of the receiving device personally.

As described above, the receiving apparatus permits simultaneous commanding of a plurality of processes relative to image, with the utilization of the electric or watermark insertion technique.

While the present invention has thus far been described in connection with a few embodiments thereof, it will readily be possible for those skilled in the art to put this invention into practice in various other manners. For example, the predetermined code and its correspondent processing content may be transmitted by the broadcast station to the receiving device through a broadcasting wave. In this case, by changing the contents from time to time, a larger number of processes can be conducted.

What is claimed is:

1. A receiving apparatus for use in reception of an image datum to which a specified datum is inserted as a watermark by a watermark insertion technique, said image datum representing an image, said specified datum comprising a specified code representing a specified process and processing content corresponding to said specified process to be executed at said receiving apparatus, said receiving apparatus comprising:

storage means for storing a predetermined code and processing code corresponding to said predetermined code;

receiving means for receiving said image datum;

producing means connected to said receiving means and responsive to said image datum for producing said image; and processing means connected to said receiving means and responsive to said image datum for comparing said specified code and said predetermined code and processing said processing content of said specified datum via said processing code to execute said specified process if said specified code is coincident with said predetermined code.

2. A receiving apparatus as claimed in claim 1, wherein said processing means comprises:

a detection circuit connected to said receiving means and responsive to said image datum for detecting said specified datum; and executing means connected to said detection circuit for executing said specified process by the use of said specified datum.

3. A receiving apparatus as claimed in claim 2, wherein said executing means comprises:
- a data storage table for storing a predetermined datum;
- a comparator circuit connected to said detection circuit and said data storage table for comparing said specified datum with said predetermined datum to produce a coincidence signal when said specified datum is coincident with said predetermined datum; and
- an output circuit connected to said comparator circuit and responsive to said coincidence signal for executing said specified process in accordance with said specified datum.

4. A receiving apparatus as claimed in claim 1, wherein said image datum is transmitted as a modulated radio signal, said receiving means comprising:
- a receiving antenna; and
- a demodulation circuit connected to said receiving antenna, said producing means, and said processing means and received with said modulated radio signal through said receiving antenna for demodulating said modulated radio signal into said image datum to supply said image datum to said producing means and said processing means.

5. A communication system comprising:
- a transmitting apparatus for transmitting an image datum to which a specified datum is inserted as a watermark by a watermark insertion technique, said image datum representing an image, said specified datum comprising a specified code representing a specified process and processing content corresponding to said specified process to be executed; and
- a receiving apparatus for use in reception of said image datum and execution of said specified process at said receiving apparatus, said receiving apparatus comprising:
    - storage means for storing a predetermined code and processing code corresponding to said predetermined code;
    - receiving means for receiving said image datum;
    - producing means connected to said receiving means and responsive to said image datum for producing said image; and
    - processing means connected to said receiving means and responsive to said image datum for comparing said specified code and said predetermined code and processing said processing content of said specified datum via said processing code to execute said specified process if said specified code is coincident with said predetermined code.

6. A communication system as claimed in claim 5, wherein said transmitted datum is transmitted by way of a radio broadcasting wave, said communication system further comprising another receiving apparatus.

7. A transmitting apparatus for use in transmission of an image datum towards a receiving apparatus, said image datum representing an image, said transmitting apparatus comprising:
- an insertion circuit for inserting a specified datum as a watermark into said image datum by a digital watermark insertion technique, said specified datum comprising a specified code representing a specified process and processing content corresponding to said specified process to be executed at said receiving apparatus, said processing content of said specified datum to be processed via processing code corresponding to the specified code stored at said receiving apparatus; and
- transmission executing means connected to said insertion circuit for executing transmission of said image datum.

8. A transmitting apparatus as claimed in claim 7, wherein said transmission executing means comprises:
- a transmitting antenna; and
- a modulation circuit connected to said insertion circuit and said transmitting antenna for modulating said image datum into a modulated radio signal to transmit said modulated radio signal through said transmitting antenna.

* * * * *